United States Patent [19]

Arai et al.

[11] Patent Number: 4,601,912
[45] Date of Patent: Jul. 22, 1986

[54] METHOD OF PREPARING A MAGNETIC RECORDING MEDIUM

[75] Inventors: Yoshihiro Arai; Ryuji Shirahata, both of Kanagawa, Japan

[73] Assignee: Fuji Photo Film Co., Ltd., Kanagawa, Japan

[21] Appl. No.: 787,960

[22] Filed: Oct. 16, 1985

[30] Foreign Application Priority Data

Oct. 16, 1984 [JP] Japan .................. 59-216927

[51] Int. Cl.$^4$ ............................ H01F 10/00
[52] U.S. Cl. ....................... 427/35; 427/130; 427/132; 427/251; 427/255.3; 427/255.7
[58] Field of Search ............... 427/35, 130, 132, 251, 427/255.3, 255.7

Primary Examiner—Bernard D. Pianalto
Attorney, Agent, or Firm—Sughrue, Mion, Zinn, Macpeak, and Seas

[57] ABSTRACT

A method for preparing a magnetic recording medium by forming a ferromagnetic vapor deposition film on a non-magnetic support moving along a rotating drum by an oblique incident evaporation method, in which a vapor flow of ferromagnetic metal is vapor-deposited on the support between a maximum incident angle and a minimum incident angle, while introducing a first oxidizing gas near the place where vapor flow of ferromagnetic metal is introduced at the minimum incident angle, and introducing a second oxidizing gas near the surface of the ferromagnetic vapor deposition film on the support which is moving on the rotating drum, wherein the improvement comprises introducing the first and second oxidizing gases so that $\Delta p_2/\Delta p_1$ is not less than 5, wherein $\Delta p_1$ is the increase of pressure due to the introduction of the first oxidizing gas near the place where the vapor flow of ferromagnetic metal is introduced at the minimum incident angle, and $\Delta p_2$ is the increase of pressure due to the introduction of the second oxidizing gas near the surface of the ferromagnetic film after the vapor deposition.

5 Claims, 1 Drawing Figure

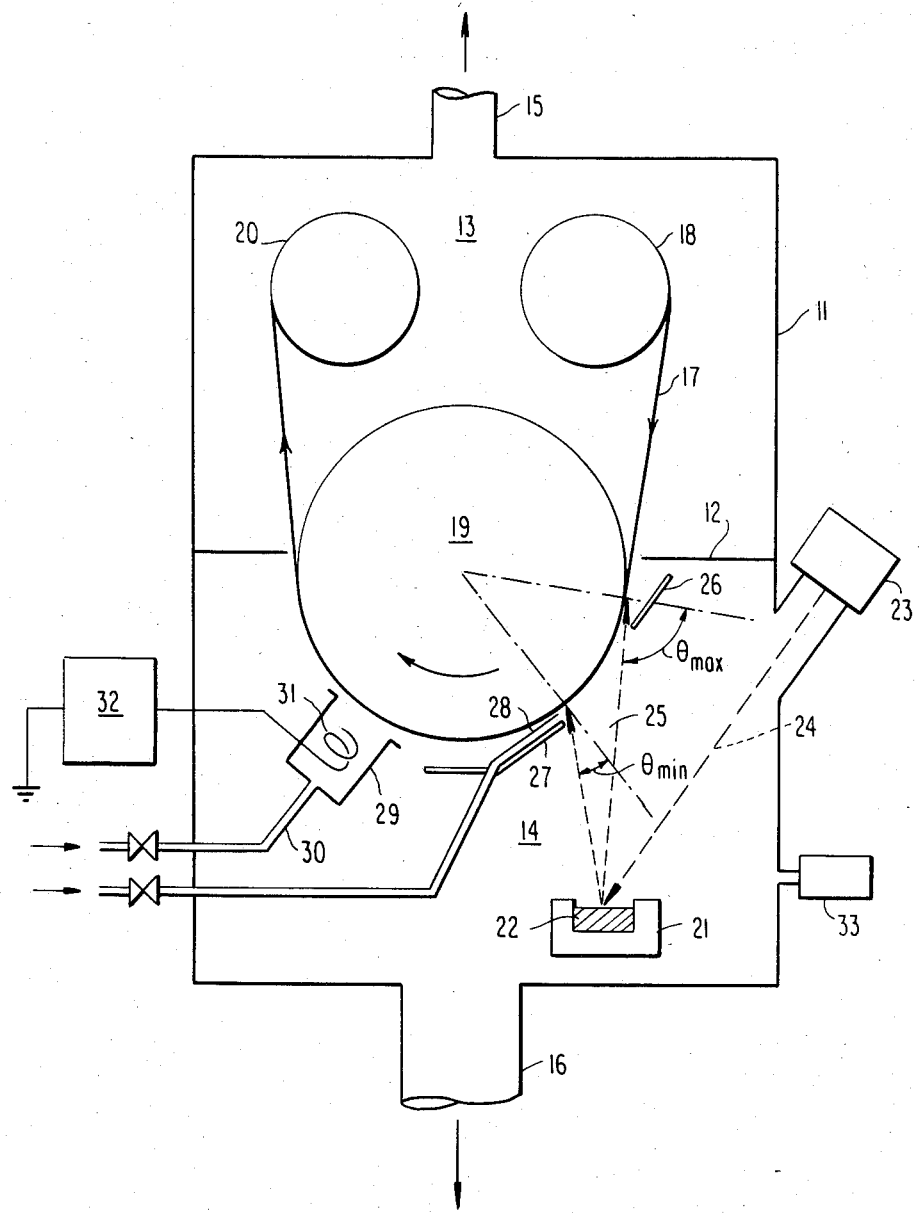

METHOD OF PREPARING A MAGNETIC RECORDING MEDIUM

FIELD OF THE INVENTION

The present invention relates to a magnetic recording medium provided as a magnetic recording layer with ferromagnetic metal thin film formed by an oblique incident evaporation method. More particularly, the invention relates to a magnetic recording medium excellent in weather resistance after repeated use, and adhesive properties of the ferromagnetic metal film.

BACKGROUND OF THE INVENTION

In the past, a coating type of magnetic recording media has been generally employed. This type of media is generally obtained by coating on a nonmagnetic support a magnetic coating composition prepared by dispersing a powdery magnetic material, e.g., a magnetic powder of an oxide such as $\gamma$-$Fe_2O_3$, Co-doped $\gamma$-$Fe_2O_3$, $Fe_3O_4$, Co-doped $Fe_3O_4$, a Berthollide compound composed of $\gamma$-$Fe_2O_3$ and $\gamma$-$Fe_3O_4$, $CrO_2$, etc., a ferromagnetic alloy powder, or so on, into an organic binder. Some conventional binders include vnyl chloride-vinyl acetate copolymer, styrene-butadiene copolymer, epoxy resin, and polyurethane resin. The coated composition is then dried to form a magnetic layer.

In recent years, there has been a demand for recording a large amount of information in a small area of recording material, which is commonly referred to as "high density recording".

With the increased demand for high density recording, there has been an increased demand for the so-called non-binder type of magnetic recording media. Such media contain no organic binders in their magnetic recording layer(s) and have as the magnetic recording layer(s) a thin film(s) of ferromagnetic metal(s) formed by the vapor deposition techniques such as vacuum evaporation, sputtering, or ion plating, or metal plating techniques such as electroplating or electroless plating. Such media have attracted the attention of the art, and various efforts for putting them to practical use have been made.

Conventional coating type magnetic recording media principally utilize metal oxides as magnetic materials. Furthermore, reduction of the thickness of such media is accompanied by a lowering of the signal output. Therefore, reduction of the thickness of the magnetic recording layer, which is necessary for increasing the recording density, is limited. In addition, they must be manufactured by complicated processes using large sized incidental equipment for recovering solvents used in the manufacturing process. Such equipment and procedures may also involve problems of environmental pollution. On the other hand, non-binder type magnetic recording media contain ferromagnetic metals, which have saturation magnetization greater than those of the above described metal oxides. Such media are in the form of a thin film which does not contain any nonmagnetic substances such as a binder. Therefore, such media can have very thin magnetic films capable of high density recording. In addition, the manufacturing processes are simple.

Magnetic recording media used for high density recording must use magnetic substances having high coercive force and a reduced thickness. Such being the case, non-binder type magnetic recording media appear to be very promising because their thickness is 1/10 less than thickness of the conventional coating type magnetic recording media. Furthermore, such media possess high magnetic flux densities.

In particular, the application of vacuum evaporation techniques to the formation of magnetic recording layers is advantageous because it is not necessary to dispose of waste solutions, unlike metal plating techniques, because of the simple manufacturing process, and because the deposition speed of the magnetic metal film can be increased to a high rate. There are known processes for manufacturing a magnetic film having coercive force and squareness ratio desired for magnetic recording media by utilizing vacuum deposition processes, e.g., an oblique incident evaporation method, as disclosed in U.S. Pat. Nos. 3,342,632 and 3,342,633.

Further, magnetic recording media provided with ferromagnetic metal thin films must have high corrosive strength. It is also desired that there is little or no decrease or unintentional erasure of signals recorded in the magnetic recording medium with the lapse of time, for example, that caused by corrosion or rust during storage.

Various methods for improving the weather resistance of magnetic recording medium have been proposed. For example, in Japanese Patent Application (OPI) Nos. 198543/82 and 17544/83 (the term "OPI" as used herein refers to a "published unexamined Japanese patent application") a method in which a magnetic vapor deposition film is formed on a non-magnetic support moving along a rotating drum and the film is exposed to an oxidizing atmosphere while it is moving along the drum is described. However, even if this method is employed, the weather resistance is not necessarily improved and the adhesive property between the film and the support is not sufficient.

SUMMARY OF THE INVENTION

An object of the invention is to provide a method for preparing a magnetic recording medium having excellent weather resistance after repeated run, and excellent adhesive properties by a vapor deposition method.

The above object of the invention can be attained by the method which comprises forming a ferromagnetic vapor deposition film on a non-magnetic support moving along a rotating drum by an oblique incident evaporation method, in which a vapor flow of ferromagnetic metal is vapor deposited on the support between a maximum incident angle and a minimum incident angle, while introducing a first oxidizing gas near the place where the vapor flow of ferromagnetic metal is introduced at the minimum incident angle, and introducing a second oxidizing gas near the surface of the ferromagnetic vapor deposition film on the support which is moving on the rotating drum, in which the first and second oxidizing gases are introduced so that $\Delta p_2/\Delta p_1$ is not less than 5, wherein $\Delta p_1$ is the increase of pressure due to the introduction of the first oxidizing gas near the place where the vapor flow of ferromagnetic metal is introduced at the minimum incident angle, and $\Delta p_2$ is the increase of pressure due to the introduction of the second oxidizing gas near the surface of the ferromagnetic film after the vapor deposition.

Preferably, the second oxidizing gas which is introduced near the surface of the vapor deposition film is electrically discharged.

BRIEF DESCRIPTION OF THE DRAWING

The sole FIGURE of the drawing illustrates an apparatus for practicing the method of preparing magnetic recording media according to the present invention.

DETAILED DESCRIPTION OF THE INVENTION

The oblique evaporation according to the present invention refers to the method of supplying the vapor flow of a ferromagnetic metal material onto the surface of a support at an incident angle $\theta$ to the normal line of the surface of the support, and depositing thereon to form a magnetic thin film. The oblique evaporation is started with a maximum incident angle of $\theta_{max}$ and the incident angle is continuously altered so as to decrease it continuously while moving the support, and then the oblique evaporation is stopped at a minimum angle $\theta_{min}$.

In the invention, the incident angle ($\theta$) is preferably 20° to 90°, the maximum incident angle ($\theta_{max}$) is preferably from 50° to 90°, and the minimum incident angle ($\theta_{min}$) is from 20° to 75°.

The thickness of the magnetic metal vapor deposition film 2 is desirably larger to provide sufficient output and desirably smaller for high density recording. Generally, the thickness is from about 0.02 μm to 5.0 μm, and preferably the thickness is from 0.05 μm to 2.0 μm.

Specific examples of magnetic metal materials which can be employed in the present invention comprise metals such as Fe, Co, and Ni, and ferromagnetic alloys such as Fe—Co, Fe—Ni, Co—Ni, Fe—Co—Ni, Fe—Rh, Fe—Cu, Co—Cu, Co—Au, Co—Y, Co—La, Co—Pr, Co—Gd, Co—Sm, Co—Pt, Ni—Cu, Fe—Cr, Co—Cr, Ni—Cr, Fe—Co—Cr, Ni—Co—Cr, and Fe—Co—Ni—Cr. Particularly preferable magnetic metal materials are Co and alloys containing 70 wt % or more of cobalt.

Turning now to the drawing, there is shown a vacuum chamber 11 which is separated into an upper room 13 for sending out and rewinding and a vapor deposition room 14 by a separating wall 12. Each room 13 and 14 can be independently degassed to a vacuum by a vacuum exhaust opening 15 and 16, respectively. A web of nonmagnetic support 17 moves from a sending roll 18 around a rotating drum 19 to a winding roll 20. An evaporaton boat 21 is installed under the rotating drum 19, and a magnetic material 22 in the evaporation boat 21 is heated and evaporated by an electron beam 24 from an electrogun 23.

A vapor flow 25 of the magnetic material 22 reaches a surface of the non-magnetic support 17 moving along the rotating drum 19 to form a magnetic vapor deposition thin film. Near the rotating drum 19, a plate (masking shields identified by the reference numerals 26 and 27) is provided so that the vapor flow 25 is introduced onto the surface of the non-magnetic support 17 at an incident angle $\theta_{max}$ and $\theta_{min}$, respectively. Near the minimum incident angle $\theta_{min}$, a nozzle 28 for introducing a first oxidizing gas is installed. Near the rotating drum 19, a hood 29 is installed and a second oxidizing gas is introduced from an introducing pipe 30 onto the surface of the ferromagnetic vapor deposition thin film on the non-magnetic support (a belt-shaped support) 17. An R.F. (radio frequency) electric discharging coil 31 connected to an R.F. electric source 32 is in the hood 29. The second oxidizing gas can be ionized by the coil 31.

The pressure in the vapor deposition room 14 can be measured by a vacuum gauge 33. An elevation of pressure $\Delta p_1$ in the present invention is defined by the difference between $p_1$ and $p_0$, accordingly, the elevation of pressure $\Delta p_1$ is represented by an equation $\Delta p_1 = p_1 - p_0$, wherein $p_0$ is a pressure in the vapor deposition room when vapor deposition is carried out without introducing oxidizing gases from the nozzle 28 and the introducing tube 30, and $p_1$ is a pressure in the vapor deposition room when vapor deposition is carried out while introducing a first oxidizing gas only from nozzle 28. An elevation of pressure $\Delta p_2$ in the present invention is defined by the difference between $p_2$ and $p_1$, accordingly, the elevation of pressure $\Delta p_2$ is represented by an equation $\Delta p_2 = p_2 - p_1$, wherein $p_2$ is a pressure in the vapor deposition room when vapor deposition is carried out while introducing a first oxidizing gas from nozzle 28 and a second oxidizing gas from introducing tube 30. The inventors have found that a magnetic recording medium which is prepared in the condition that $\Delta p_2 / \Delta p_1$ is not less than 5, preferably 5 to 50, and more preferably 5 to 30 can provide excellent weather resistance and adhesive property. In this case $p_0$ is $1 \times 10^{-6}$ to $2 \times 10^{-4}$ Torr, preferably $1 \times 10^{-6}$ to $1 \times 10^{-4}$ Torr, $p_1$ is $8 \times 10^{-5}$ to $8 \times 10^{-4}$ Torr, preferably $1 \times 10^{-4}$ to $6 \times 10^{-4}$ Torr, and $p_2$ is $4 \times 10^{-4}$ to $5 \times 10^{-3}$ Torr, preferably $5 \times 10^{-4}$ to $3 \times 10^{-3}$ Torr.

A suitable oxidizing gas which can be used in the present invention for either the first or second oxidizing gas comprises an oxygen gas, a gas containing an oxygen-containing compound such as $NO_2$, $CO_2$, $H_2O$, etc., or a gas mixture of oxygen gas and another gas such as $O_2 + Ar$, $O_2 + N_2$, etc.

Evaporation methods which can be employed in the present invention include not only a conventional vacuum deposition method as disclosed in U.S. Pat. No. 3,342,632, but also any method known for forming thin films on a support in an atmosphere of evaporated molecules having a mean free path elongated by ionizing or accelerating the vapor flow by application of an electric field or a magnetic field thereacross, or by irradiation with electron beams. For example, an electric field vapor deposition method is disclosed in U.S. Pat. No. 4,354,908, and the ionizing vapor deposition methods are disclosed in U.S. Pat. Nos. 3,406,040 and 3,573,981, Japanese Patent Publication Nos. 20484/71 and 26579/72, and Japanese Patent Application (OPI) Nos. 33890/74, 34483/74 and 535/74.

The support in the present invention can include plastic films or foils such as polyethylene terephthalate, polyimide, polyamide, polyvinyl chloride, cellulose triacetate, polycarbonate, or polyethylene naphthalate. The thickness of the support is 3 to 50 μm, preferably 5 to 30 μm.

In the magnetic recording medium of the present invention, a lubricating layer and/or a backing layer can be provided, if desired. The backing layer is provided on a back surface of the support. Further, a layer containing an organic or inorganic substance can be provided between the magnetic metal vapor deposition film and the support. These are described in U.S. Pat. No. 4,414,270.

The invention is explained in more detail by the following examples, but it is to be understood that the present invention is not limited to the examples.

EXAMPLE 1

A magnetic tape was prepared by forming a cobalt thin film on a polyethylene terephthalate film having a thickness of 12.5 μm by using a winding vapor deposition apparatus shown in the drawing and by an oblique incident vapor deposition method in the following conditions.

Width of polyethylene terephthalate film: 200 mm
Carrying speed of the film: 20 m/min
$\theta_{max}$: 90°
$\theta_{min}$: 40°

Thickness of the vapor deposition thin film: 0.15 μm
Magnetic tape samples were prepared under various $\Delta p_2/\Delta p_1$ by introducing 380 cc/min of oxygen gas from the nozzle 28 and by changing the amount of oxygen gas from the introducing tube 30. The pressure $p_1$ was $1.1 \times 10^{-4}$ Torr and $\Delta p_1$ was $5 \times 10^{-5}$ Torr when 380 cc/min of oxygen gas was introduced only from the nozzle 28 in the vapor deposition room.

The weather resistance of the thus obtained magnetic tape samples was measured by five grade evaluation of generated rust state after storage of 24 hours by using a water drop generating type weather tester (trademark: "E-12 WG", manufactured by Yamazaki Seiki Research Laboratories, Co., Ltd.). Further, the adhesive property of the magnetic thin film was measured by an adhesive tape peel test as disclosed in *Handbook of Thin Film Technology*, pages 12 to 16, published by McGraw-Hill Co. in 1970. The thus conducted tests were evaluated by five grades, with 5 indicating the most favorable characteristics, and the evaluation of the weather resistance and the adhesive property are shown below.

Five Grade Evaluation of Weather Resistance

1. Rust is observed remarkably with naked eye.
2. Rust is observed with naked eye.
3. Rust is hardly observed with naked eye.
4. Rust is observed with a microscope (×50).
5. Rust is not observed with a microscope (×50).

Five Grade Evaluation of Adhesive Property

1. The vapor deposition films are peeled apart completely.
2. 75% of the vapor deposition films are peeled apart.
3. 50% of the vapor deposition films are peeled apart.
4. 25% of the vapor deposition films are peeled apart.
5. The vapor deposition films are not peeled apart at all.

The results are shown in Table 1.

TABLE 1

| Sample No. | $\Delta p_2/\Delta p_1$ | Pressure $p_2$ (Torr) | Weather Resistance | Adhesive Property |
|---|---|---|---|---|
| 1 | 0 | $1.1 \times 10^{-4}$ | 1 | 2 |
| 2 | 2 | $2.1 \times 10^{-4}$ | 2 | 3 |
| 3 | 5 | $3.6 \times 10^{-4}$ | 4 | 5 |
| 4 | 9 | $5.6 \times 10^{-4}$ | 5 | 5 |
| 5 | 14 | $8.1 \times 10^{-4}$ | 5 | 5 |

EXAMPLE 2

A magnetic tape was prepared by forming a cobalt-nickel (Ni content: 20 wt %) thin film on a polyethylene terephthalate film having a thickness of 9.5 μm by using a winding vapor deposition apparatus as shown in the drawing and by an oblique incident vapor deposition method in the following conditions.

Width of polyethylene terephthalate film: 300 mm
Carrying speed of the film: 40 m/min
$\theta_{max}$: 90°
$\theta_{min}$: 50°

Thickness of the vapor deposition thin film: 0.12 μm
Magnetic tape samples were prepared under various $\Delta p_2/\Delta p_1$ by introducing 500 cc/min of oxygen gas from the nozzle 28 and by changing the amount of oxygen gas from the introducing tube 30. A 500 watt R.F. (radio frequency) was applied to the coil 31 to generate an electric discharge. The pressure $p_1$ was $9 \times 10^{-5}$ Torr and $\Delta p_1$ was $4 \times 10^{-5}$ Torr when oxygen gas was introduced only from the nozzle 28 into the vapor deposition room. The weather resistance and an adhesive property of the thus prepared magnetic tape samples were measured in the same manner as in Example 1, and the results are shown in Table 2.

TABLE 2

| Sample No. | $\Delta p_2/\Delta p_1$ | Pressure $p_2$ (Torr) | Weather Resistance | Adhesive Property |
|---|---|---|---|---|
| 6 | 0 | $0.9 \times 10^{-4}$ | 1 | 2 |
| 7 | 3 | $2.1 \times 10^{-4}$ | 2 | 2 |
| 8 | 5 | $2.9 \times 10^{-4}$ | 4 | 5 |
| 9 | 10 | $4.9 \times 10^{-4}$ | 4 | 5 |
| 10 | 15 | $6.9 \times 10^{-4}$ | 5 | 5 |

In the above results of Tables 1 and 2, the evaluation 4 and 5 are suitable for practical use.

It is apparent from the results of Tables 1 and 2 that a magnetic recording medium of the present invention which is prepared in the condition that $\Delta p_2/\Delta p_1$ is not less than 5 has good weather resistance and good adhesive property.

According to the method of the present invention, a metal thin film type magnetic recording medium having an improved weather resistance and adhesive property can be prepared. Therefore, the method of the present invention and the magnetic recording medium prepared by the method of the present invention have practical advantages.

While the invention has been described in detail and with reference to specific embodiments thereof, it will be apparent to one skilled in the art that various changes and modifications can be made therein without departing from the spirit and scope thereof.

What is claimed is:

1. A method for preparing a magnetic recording medium by forming a ferromagetic vapor deposition film on a non-magnetic support moving along a rotating drum by an oblique incident evaporation method, in which a vapor flow of ferromagnetic metal is vapor-deposited on the support between a maximum incident angle and a minimum incident angle, while introducing a first oxidizing gas near the place where vapor flow of ferromagnetic metal is introduced at the minimum incident angle, and introducing a second oxidizing gas near the surface of the ferromagnetic vapor deposition film on the support which is moving on the rotating drum, wherein the improvement comprises introducing the first and second oxidizing gases so that $\Delta p_2/\Delta p_1$ is not less than 5, wherein $\Delta p_1$ is the increase of pressure due to the introduction of the first oxidizing gas near the place where the vapor flow of ferromagnetic metal is introduced at the minimum incident angle, and $\Delta p_2$ is the increase of pressure due to the introduction of the second oxidizing gas near the surface of the ferromagnetic film after the vapor deposition.

2. The method for preparing a magnetic recording medium as claimed in claim 1, wherein the oxidizing gas which is introduced near the surface of the vapor deposition film is electrically discharged.

3. The method for preparing a magnetic recording medium as claimed in claim 1, wherein the $\Delta p_2/\Delta p_1$ is from 5 to 50.

4. The method for preparing a magnetic recording medium as claimed in claim 1, wherein the oxidizing gas for the first and second oxidizing gases comprises an oxygen gas, a gas containing an oxygen-containing compound or a gas mixture of oxygen gas and another gas.

5. The method for preparing a magnetic recording medium as claimed in claim 1, wherein the maximum incident angle is from 50° to 90°, and the minimum incident angle is from 20° to 75°.

* * * * *